(12) United States Patent  (10) Patent No.: US 7,450,975 B2
Harris (45) Date of Patent: Nov. 11, 2008

(54) SYSTEM AND METHOD FOR IMPROVING BATTERY LIFE OF A MOBILE STATION

(75) Inventor: John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 438 days.

(21) Appl. No.: 11/236,990

(22) Filed: Sep. 28, 2005

(65) Prior Publication Data

US 2007/0072653 A1 Mar. 29, 2007

(51) Int. Cl.
  H04B 1/38 (2006.01)
  H04M 1/00 (2006.01)
(52) U.S. Cl. .............. 455/574; 455/343.5; 455/572; 455/522; 455/343.2; 455/343.4; 370/311; 370/335
(58) Field of Classification Search ............ 455/574, 455/343.4, 572, 522, 343.2
  See application file for complete search history.

(56) References Cited

U.S. PATENT DOCUMENTS

| 5,539,748 A | * | 7/1996 | Raith | 370/329 |
| 5,870,685 A | * | 2/1999 | Flynn | 455/573 |
| 5,873,836 A | * | 2/1999 | Kahn et al. | 600/493 |
| 5,991,600 A | * | 11/1999 | Anderson et al. | 340/7.34 |
| 5,991,635 A | * | 11/1999 | Dent et al. | 455/517 |
| 5,999,830 A | * | 12/1999 | Taniguchi et al. | 455/574 |
| 6,018,650 A | * | 1/2000 | Petsko et al. | 455/234.1 |
| 6,031,362 A | * | 2/2000 | Bradley | 323/269 |
| 6,058,289 A | * | 5/2000 | Gardner et al. | 340/7.32 |
| 6,560,453 B1 | | 5/2003 | Henry, Jr. et al. | |
| 6,872,973 B1 | * | 3/2005 | Koyama et al. | 257/59 |
| 7,215,956 B2 | * | 5/2007 | Liu et al. | 455/434 |
| 7,283,818 B2 | * | 10/2007 | Rajkotia et al. | 455/434 |
| 7,302,261 B2 | * | 11/2007 | Rajkotia et al. | 455/434 |
| 7,328,035 B2 | * | 2/2008 | Kelley et al. | 455/518 |
| 7,330,733 B2 | * | 2/2008 | Harris et al. | 455/518 |
| 2003/0099214 A1 | * | 5/2003 | Schmidt et al. | 370/328 |

* cited by examiner

Primary Examiner—Marceau Milord
(74) Attorney, Agent, or Firm—Brian M. Mancini

(57) ABSTRACT

At least one Radio Frequency (RF) operating condition associated with a mobile station (102) is obtained. The RF operating condition is compared to an optimum value. When the RF operating condition is substantially different from the optimum value, the paging cycle is adjusted in order to conserve power in a battery associated with the mobile station (102).

8 Claims, 3 Drawing Sheets

SYSTEM AND METHOD FOR IMPROVING BATTERY LIFE OF A MOBILE STATION

FIELD OF THE INVENTION

The field of the invention relates to mobile stations in networks and the battery conditions at these mobile stations.

BACKGROUND OF THE INVENTION

To operate, a mobile station needs a power source and, in most cases, this power source is a battery. For instance, cellular phones use various types of batteries to operate. The amount of time a mobile station can typically operate before the power of the battery is consumed (i.e., the battery life) is often an important criteria that consumers use in choosing one brand or type of mobile station over another brand or type of mobile station.

The standby battery life of a mobile station is often unpredictable and may be affected by a variety of factors. For instance, a majority of the energy of the battery is often drained during a relatively small percentage of time, for instance, during periods when the mobile station experiences poor Radio Frequency (RF) operating conditions. Typically, the mobile station wakes up periodically, and checks to see if there is an incoming page message. In these situations, this drain rate may be five times higher than the normal drain rate for the battery. This can occur because the amount of time required to decode the incoming page message is much longer if the mobile is experiencing poor signal strength. Consequently, poor RF operating environments typically shorten the battery life dramatically.

Additionally, poor RF operating environments can cause the user to be surprised and/or frustrated when the battery runs out much more quickly than would typically be expected by the user. Thus, a variation of the battery life is also undesirable from the user perspective.

Battery life is also affected by operating processes, such as in audio environments. For example, some previous systems attempted to increase capacity by lengthening the play-out time of play-out buffers during busy hours. Other previous systems accumulated more audio data in the play-out buffers before initiating the audio play-out at a target mobile station. This extended operating time requires more battery capacity.

Other previous systems used streaming services, which adapted to poor RF conditions or heavy system loading by using degraded Quality-of-Service (QoS) and, therefore, a longer play-out buffer. In this way, these services sometimes reduced the amount of Radio Frequency (RF) and network resources being used during peak loading. Under these approaches, the mobile typically waited a longer period of time to accumulate audio before beginning audio play out to the target. Consequently, these systems that utilized streaming services with QoS that was selectively degraded during busy hour/poor RF conditions, resulted in unnecessarily poor standby battery life. In other previous approaches such as in High Rate Packet Data(HRPD) systems and other systems using incremental redundancy (IR) on the paging channel (PCH), the mobile station must wait and combine more messages before going to sleep thereby depleting the battery. Unfortunately, user frustration with the previous systems occurred as calls were dropped or could not even be initiated due to a depleted battery. Moreover, these approaches resulted in battery life that was unsatisfactory for given user delay requirements.

What is needed is a mobile which can use degraded QoS and use a longer play out buffer by using a longer paging interval so that more audio would accumulate in the speaker or network before the target is placed on traffic channel. In these cases, the accumulated audio can be rapidly downloaded to the target and then the degraded QoS may be used for the target.

Figure 2:
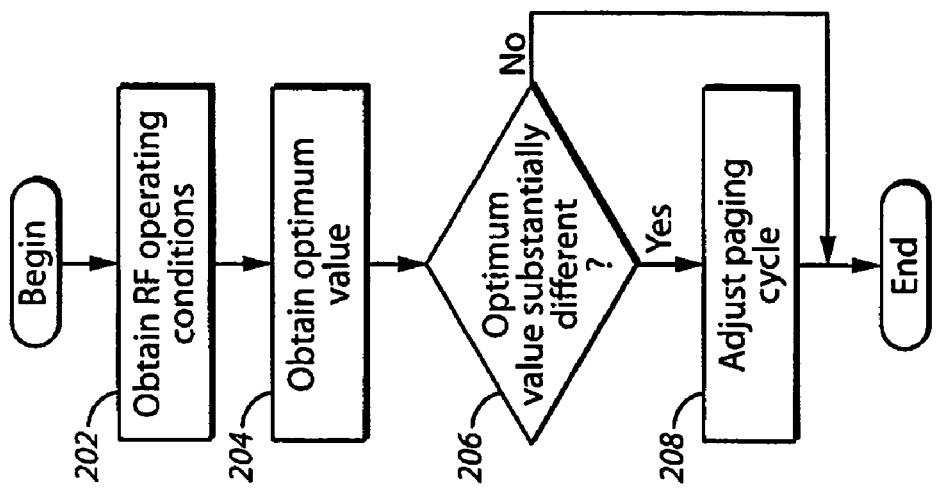
FIG. 2 is a flowchart of one example of an approach for improving the battery life of a mobile station according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method is described that adjusts the paging cycle length associated with a mobile station in order to conserve and improve the battery life of the mobile station. The approaches described herein allow a mobile station to operate in a variety of adverse conditions and provide a variety of bandwidth intensive services without substantially compromising the battery life of the mobile station.

In many of these embodiments, at least one Radio Frequency (RF) operating condition associated with a mobile station is obtained. The RF operating condition is compared to an optimum value. As used herein, "optimum value" refers to a value selected by a system administrator, user, or other party wherein the value is selected in order to achieve or facilitate the benefits described herein. When the RF operating condition is substantially different from the optimum value, the paging cycle is adjusted in order to conserve power in a battery associated with the mobile station.

Adjustments to the paging cycle may be made in a variety of different ways. In one example, the length of the paging cycle may be increased. In another example, the size of a slot cycle index of the paging cycle may be changed.

Further adjustments may also be made to the paging cycle. For instance, if the paging cycle has been lengthened, the length may be returned to its original length after the expiration of a period of time or to an optimal value that is related to the RF operating conditions. In another example, if the slot size has been adjusted, the size of the slot cycle index may be returned to the original size after the expiration of a period of time or to an optimal size that is related to the measured RF operating conditions.

The RF operating conditions may represent a variety of conditions associated with the RF environment of the mobile station. For example, the RF operating conditions may be related to the capacity or remaining capacity of a sector in which the mobile station is operating, a signal strength a variance of RF conditions, an expected RF operational condition over a next time interval, or a redundancy condition. Other examples of operating conditions are possible.

Different combinations of adjustments may be made to the paging cycle based upon various combinations of RF operating conditions. To give one example, the length of the paging cycle may be increased as the remaining capacity of the sector in which the mobile station is operating decreases or is less than a threshold.

Thus, approaches are described whereby the battery life of the mobile station is improved even under less than ideal operating condition and different modes of operation. Consequently, the mobile station can operate under a variety of operating conditions.

Figure 1:
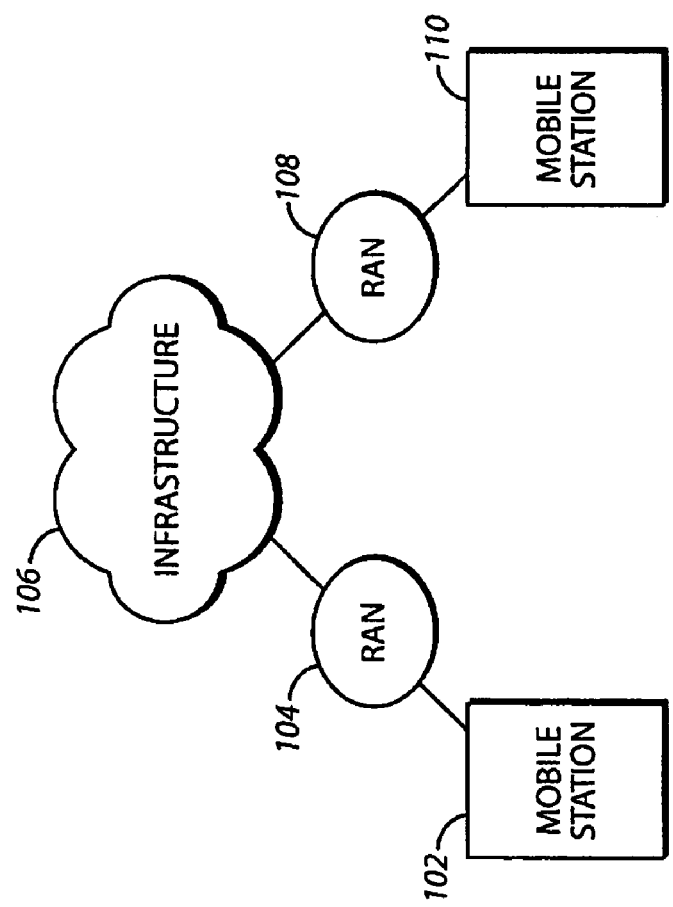
FIG. 1 is a block diagram of a system for improving the battery life of a mobile station according to the present invention.

Referring now to FIG. 1, one example of a system for increasing the battery life of a mobile station is described. The system includes a first mobile station 102 that is coupled to a first Radio Access Network (RAN) 104. The first RAN 104 is coupled to a communication infrastructure 106. A second mobile station 110 is coupled to a second RAN 108. The second RAN 108 is also coupled to the infrastructure 106. The principles described herein may be applied to a variety of systems such as High Rate Packet Data (HRPD) systems which use incremental redundancy (IR) on the paging channel (PCH), or systems such as the Universal Mobile Telecommunication System (UMTS) that use an indicator channel like a Pilot Channel (PICH).

The mobile stations 102 and 110 may be any type of mobile wireless device. For example, the mobile stations 102 and 110 may be cellular telephones, pagers, personal computers, or personal digital assistants. Other examples of mobile stations are possible.

The RANs 104 and 108 may be any device or combination of devices that allow the mobile stations 102 and 110 to have access to the communication infrastructure 106. For example, the RANs 104 and 108 may include base stations, base station controllers, antennas, and other types of devices that facilitate these communications.

The communication infrastructure 106 preferably includes devices and/or networks that allow communications to be made between mobile stations. For example, the infrastructure 106 may include switches, servers, storage devices, and networks (e.g., wireless networks, the Internet, landline telephone networks) that facilitate communications between the mobile stations 102 and 110.

In one example of the operation of the system of FIG. 1, at least one Radio Frequency (RF) operating condition associated with a mobile station 102 or 110 is obtained. The RF operating condition is compared to a value the preferably comprises an optimum value. As mentioned above and as used herein, "optimum value" refers to a value selected by a system administrator, user, or other party wherein the value is selected in order to achieve or facilitate the benefits described herein. For instance, if the Radio Frequency (RF) conditions time averaged or expected over the next time interval are poor (e.g., based upon recent reports or a long pattern of data points) the value may not be optimal. In another example, a measured condition may less than optimal when less than a threshold.

When the RF operating condition is substantially different from the optimum value, the paging cycle is adjusted in order to conserve power in a battery associated with the mobile station 102 or 110. In one example, the length of the paging cycle may be increased. After the paging cycle has been lengthened, the length may be returned to its original length after the expiration of a period of time or an optimal value that is related to the RF operating conditions. In another example, the system may increase paging channel, Quick Paging Channel (QPCH), or Pilot Channel (PICH) indicator redundancy as well as slot length.

In another example, the size of a slot cycle index of the paging cycle may be changed. Thereafter, the size of the slot cycle index may be returned to an optimal value. For instance, the size may be returned to the original size after expiration of a period of time and an optimal size that is related to measured RF operating conditions.

The RF operating condition may be a capacity of a sector in which the mobile station 102 or 110 is operating, an expected RF operational condition over a next time interval, and a redundancy condition. In one example, the length of the paging cycle comprises may be increased as RF conditions worsen.

In another approach, the paging cycle may be adjusted based upon a characteristic of the mobile station. For instance, the characteristic may be that the mobile station is currently operating a streaming service, a lower mobility of the mobile station, the mobile station is not plugged into a wired battery life source, or the remaining battery life is less than a threshold. Other examples are possible.

Referring now to FIG. 2, one example of an approach for lengthening the battery life of a mobile station is described. At step 202, RF operating conditions are obtained. For instance, if this approach is performed within a communications infrastructure, the operating conditions may be obtained by using other elements of the infrastructure. If the approach is performed at a mobile station, then the operating conditions or information representing the operating conditions may be sent to the mobile station.

At step 204, an optimum value for each of the operating conditions is obtained. For instance, the optimum values may be stored in memory. At step 206, the operating conditions are compared to the optimum value to determine if the two characteristics are substantially different. For instance, a predetermined deviation amount may be tolerated before the operating condition is deemed to be substantially different from the optimum value. If the answer at step 206 is negative, then execution ends. If the answer is affirmative, then execution continues with step 208.

At step 208, the paging cycle may be adjusted. In one example, the length of the paging cycle may be increased. After the paging cycle has been lengthened, the length may be returned to its original length after the expiration of a period of time or an optimal value that is related to the RF operating conditions. For example, if the nominal paging slot cycle interval is 320, 426 or 640 milliseconds, then a lengthened paging interval could be 1.2 seconds or 5.1 seconds. Other examples are possible.

In another example, the size of a slot cycle index of the paging cycle may be changed. The size of the slot cycle index may be returned to an optimal value. The size may be returned to the original size after expiration of a period of time and an optimal size that is related to measured RF operating conditions.

Figure 3:
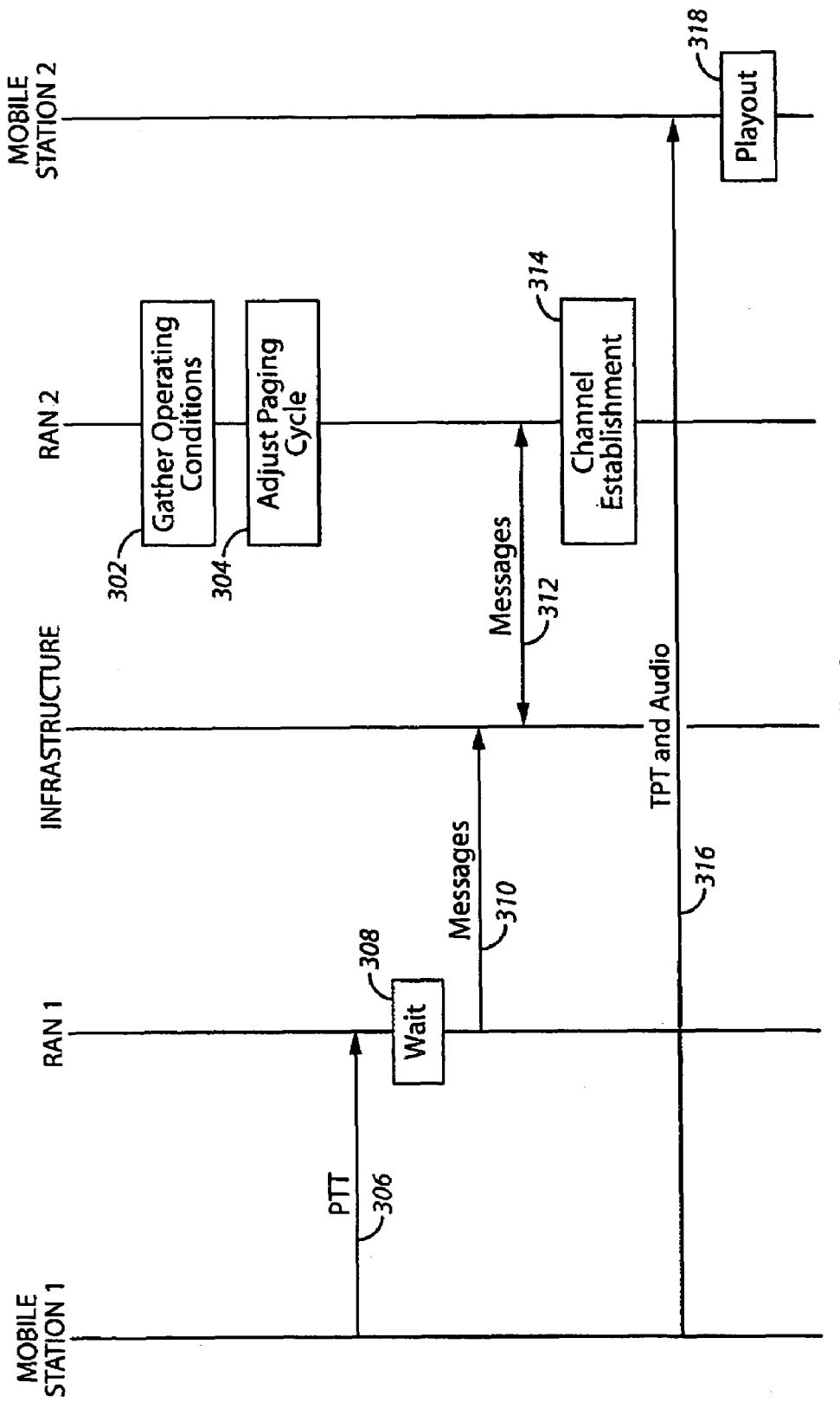
FIG. 3 is a call flow diagram of one approach for improving the battery life of a mobile station according to the present invention.

Referring now to FIG. 3, another embodiment for improving the battery life of a mobile station is described. At step 302, the infrastructure gathers operating conditions from one or more sources. At step 304, the paging cycle is adjusted based upon measured RF conditions. For example, the RF operating conditions may be poor and the paging cycle can be increased accordingly. In addition, although steps 302 and 304 are described in this example as being implemented within the communication infrastructure either or both of these steps may be implemented at other system elements such as at the mobile stations.

At step 306, a Push-To-Talk (PTT) call is initiated at a first mobile station (Mobile Station 1). At step 308, a PTT call message is received at a first Radio Access Network (RAN 1). The system then rests for a waiting period (between wake up intervals) before the second mobile station (Mobile Station 2) powers up to receive communications. The increased waiting period improves the battery life of the mobile stations since the listener (Mobile Station 2) waits between intervals and does not waste battery power waiting on the channel.

At step 310, messages are sent from the first RAN to the infrastructure. At step 312, messages are exchanged between the infrastructure and the second mobile station (Mobile Station 2).

At step 314, channel establishment occurs. During this step, the communication channels between the first and second mobile stations are fully established. At step 312, a Talk Permit Tone (TPT) and audio is sent across the RAN 1 and the infrastructure and the RAN 2 to the second mobile station. At step 314, the audio is played out at the second mobile station.

Figure 4:
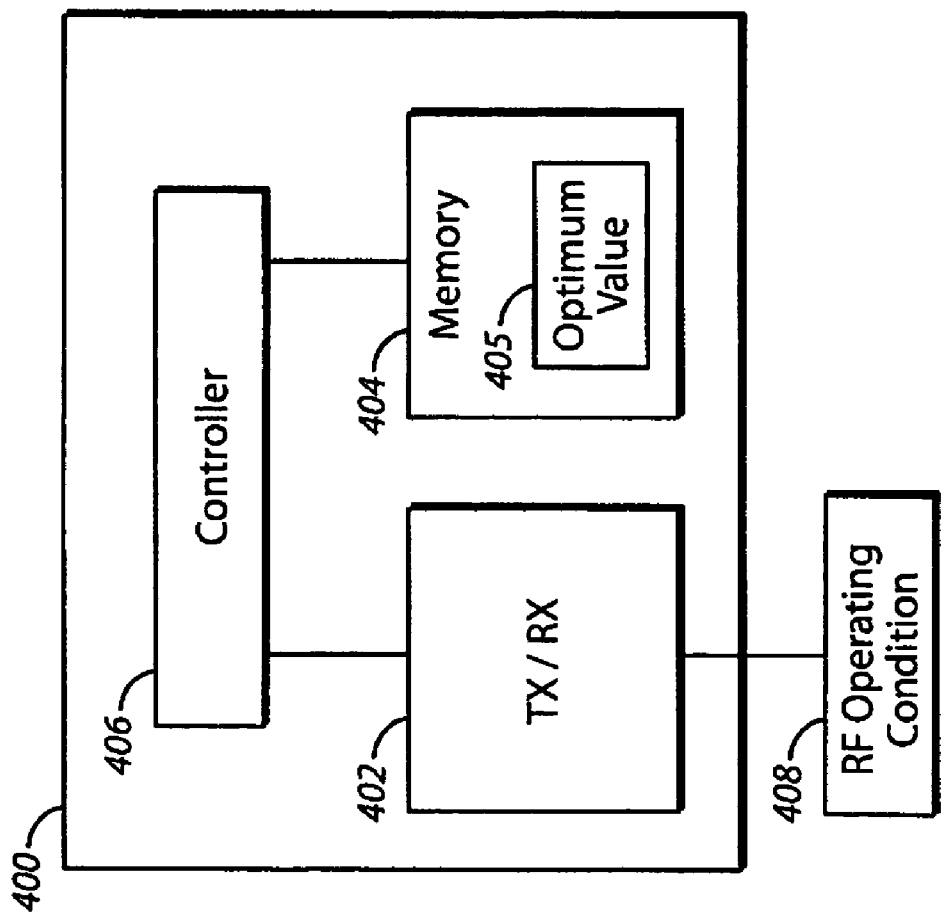
FIG. 4 is a block diagram of a device that provides for an improved battery life according to the present invention.

Referring now to FIG. 4, one example of an apparatus 400 for improving the battery life of a mobile station is described. The apparatus 400 can be incorporated into the communication infrastructure. In another approach, the apparatus 400 may be incorporated into a mobile station. Other placements for the apparatus 400 are possible.

The apparatus 400 includes a transmitter/receiver 402, a memory 404, and a controller 406. The memory 404 has information stored therein indicative of an optimum operating value for at least one RF operating condition. The controller 406 is coupled to the receiver 402, and the memory 404.

The controller 406 is programmed to receive the at least one RF operating condition 408 at the input of the transmitter/receiver 402 and determine when the at least one RF operating condition is substantially different from the optimum operating value 405 stored in the memory 404 and to responsively adjust a paging cycle in order to conserve power in a battery associated with the mobile station 400.

Thus, approaches are described whereby the battery life of a mobile station is improved regardless of the operating environment or mode of the mobile station. Consequently, the mobile station can operate in a variety of operating conditions and utilize power-consuming services while maintaining and improving the battery lifetime of the mobile station. Because of the improved battery lifetime provided by these approaches, the user experience with the mobile station is significantly enhanced.

Those skilled in the art will recognize that a wide variety of modifications, alterations, and combinations can be made with respect to the above described embodiments without departing from the broad scope of the invention, and that such modifications, alterations, and combinations are to be viewed as being within the scope of the invention.

What is claimed is:

1. A method of lengthening the battery life of a mobile station comprising the steps of:

obtaining a sector capacity in which the mobile station is operating;

initiating a Push-To-Talk (PTT) call message at the mobile station operating in a first Radio Access Network (RAN);

receiving the PTT call message at the first RAN;

increasing a length between paging cycles when the sector capacity is less than a threshold by resting for a waiting period between wake up intervals before a second mobile station in a second RAN powers up to receive communications in order to conserve power in a battery associated with the mobile station;

sending a message from the first RAN to the second RAN;

exchanging a message between the second RAN and the second mobile station;

establishing a channel between the first and second mobile stations;

sending a Talk Permit Tone (TPT) across the first and second RAN to the first mobile station; and playing out audio at the second mobile station.

2. The method of claim 1 further comprising returning the length of the paging cycle to an optimum value when the sector capacity is greater than the threshold.

3. The method of claim 2 wherein returning the length of the paging cycle to the optimum value comprises returning the length to a value, the value being selected from a group comprising: an original length after expiration of a period of time, and an optimal value that is related to RF operating conditions.

4. The method of claim 1 wherein lengthening the paging cycle comprises increasing a size of a slot cycle index of the paging cycle.

5. The method of claim 4 further comprising subsequently returning the size of the slot cycle index to an optimal value when the sector capacity is greater than the threshold.

6. The method of claim 5 wherein returning the size of the slot cycle index to an optimal value comprises returning the size to a value, the value being selected from a group comprising: an original size after expiration of a period of time and an optimal size that is related to measured RF operating conditions.

7. The method of claim 1 where the paging cycle is further adjusted based upon a characteristic of the mobile station selected from a group comprising: the mobile station is currently operating a streaming service; a lower mobility of the mobile station; the mobile station is not plugged into a wired battery life source; and a remaining battery life is less than a threshold.

8. A system for lengthening the battery life of a mobile station comprising:

a receiver having an input;

a memory having information stored therein indicative of a threshold value for a sector capacity; and a controller coupled to the receiver and the memory, the controller programmed to obtain the sector capacity in which the mobile station is operating at the input of the receiver, wherein when the mobile station operating in a first Radio Access Network (RAN) initiates a Push-To-Talk (PTT) call message which is received at the first RAN, the controller is programmed to determine if the sector capacity is less than the threshold stored in the memory and to responsively increase a length between paging cycles when the sector capacity is less than the threshold by resting for a waiting period between wake up intervals before a second mobile station in a second RAN powers up to receive communications in order to conserve power in a battery associated with the mobile station, and wherein upon the sending of a message from the first RAN to the second RAN, exchanging a message between the second RAN and the second mobile station, and establishing a channel between the first and second mobile stations, the mobile station sends a Talk Permit Tone (TPT) across the first and second RAN to the first mobile station for playing out audio at the second mobile station.

* * * * *